United States Patent
Akkarakaran et al.

(10) Patent No.: US 12,092,752 B2
(45) Date of Patent: Sep. 17, 2024

(54) HANDLING POSITIONING SESSIONS DURING CELL TIMING SOURCE OUTAGES

(71) Applicant: QUALCOMM Incorporated, San Diego, CA (US)

(72) Inventors: Sony Akkarakaran, Poway, CA (US); Jingchao Bao, San Diego, CA (US); Tao Luo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 18/340,973

(22) Filed: Jun. 26, 2023

(65) Prior Publication Data

US 2023/0333203 A1 Oct. 19, 2023

Related U.S. Application Data

(62) Division of application No. 17/402,160, filed on Aug. 13, 2021, now Pat. No. 11,754,665.

(51) Int. Cl.
| | | |
|---|---|---|
| H04W 56/00 | (2009.01) | |
| G01S 5/10 | (2006.01) | |
| H04W 4/02 | (2018.01) | |
| H04W 4/029 | (2018.01) | |
| H04W 64/00 | (2009.01) | |

(52) U.S. Cl.
CPC .............. *G01S 5/10* (2013.01); *H04W 4/023* (2013.01); *H04W 4/029* (2018.02); *H04W 64/006* (2013.01); *H04W 56/0055* (2013.01)

(58) Field of Classification Search
None
See application file for complete search history.

(56) References Cited

U.S. PATENT DOCUMENTS

| | | |
|---|---|---|
| 5,245,637 A | 9/1993 | Gersbach et al. |
| 8,818,324 B1 | 8/2014 | Hines, III |
| 2007/0177605 A1* | 8/2007 | Benco .................. H04B 7/2693 370/216 |
| 2007/0281662 A1 | 12/2007 | Kim et al. |
| 2010/0227605 A1 | 9/2010 | Fournier |

(Continued)

FOREIGN PATENT DOCUMENTS

WO 2020167773 A1 8/2020

OTHER PUBLICATIONS

ETSI MCC: "Report of 3GPP TSG RAN WG2 Meeting #113bis-e, Online", 3GPP TSG-RAN WG2 meeting #114-e, Draft_R2-113bis-E_Meeting_Report_V3, 3rd Generation Partnership Project (3GPP), Mobile Competence Centre, 650, Route Des Lucioles, F-06921 Sophia-Antipolis Cedex, France, No. Online, Apr. 12, 2021-Apr. 20, 2021, May 10, 2021, 279 Pages, XP052003691, pp. 136-148.

(Continued)

*Primary Examiner* — German Viana Di Prisco
(74) *Attorney, Agent, or Firm* — Sunstein LLP

(57) ABSTRACT

Techniques are provided for handling positioning sessions in response to a timing source outage. An example method for configuring a positioning method based on a timing source outage includes receiving an indication of the timing source outage from a station, determining the positioning method based at least in part on the indication of the timing source outage, and sending an indication of the positioning method to one or more network entities.

14 Claims, 16 Drawing Sheets

(56) References Cited

U.S. PATENT DOCUMENTS

| | | | |
|---|---|---|---|
| 2012/0119949 A1* | 5/2012 | Takahashi | G01S 19/46 342/357.29 |
| 2014/0177468 A1* | 6/2014 | Kazmi | H04W 24/04 370/254 |
| 2016/0216390 A1 | 7/2016 | Favreau et al. | |
| 2017/0150463 A1 | 5/2017 | Shen et al. | |
| 2022/0407369 A1 | 12/2022 | Hu et al. | |
| 2023/0050866 A1 | 2/2023 | Akkarakaran | |
| 2023/0109359 A1 | 4/2023 | Back et al. | |
| 2023/0296752 A1* | 9/2023 | Thomas | G01S 13/765 342/125 |

OTHER PUBLICATIONS

International Search Report and Written Opinion—PCT/US2022/031731—ISA/EPO—Sep. 8, 2022.
Kalbkhani H., et al., "Relay Selection for Multi-Source Network-Coded D2D Multicast Communications in Heterogeneous Networks", Wireless Networks, ACM, 2 Penn Plaza, Suite 701—New York USA, vol. 26, No. 8, Jul. 15, 2020 (Jul. 15, 2020), 18 Pages, XP037259749 [retrieved on Jul. 15, 2020] p. 6066-p. 6070.

* cited by examiner

HANDLING POSITIONING SESSIONS DURING CELL TIMING SOURCE OUTAGES

CROSS-REFERENCE TO RELATED APPLICATION

This application is a divisional of U.S. patent application Ser. No. 17/402,160, filed on Aug. 13, 2021, entitled "HANDLING POSITIONING SESSIONS DURING CELL TIMING SOURCE OUTAGES," which is assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points. Stations in a wireless network may be configured to transmit reference signals to enable mobile device to perform positioning measurements. Some positioning methods are dependent on messages which are transmitted via synchronized timing information. Outages in network timing resources may affect the accuracy of the position estimates for the mobile devices in the network.

SUMMARY

An example method for providing an indication of a timing source outage in a communication network according to the disclosure includes detecting an outage of a timing source, wherein one or more positioning signals are synchronized with the timing source, and sending the indication of the timing source outage to a network entity.

An example method for configuring a positioning method based on a timing source outage according to the disclosure includes receiving an indication of the timing source outage from a station, determining the positioning method based at least in part on the indication of the timing source outage, and sending an indication of the positioning method to one or more network entities.

Items and/or techniques described herein may provide one or more of the following capabilities, as well as other capabilities not mentioned. A station in a communication network may be configured to transmit reference signals for positioning. The reference signals may be based on synchronized timing across the network. Satellite navigation systems may be used to synchronize the timing of the stations, however, satellite signals are susceptible to jamming and other effects which may impact reception of the signals and the timing synchronization of the stations. A station may experience a timing source outage when satellite signals are not received and/or decoded. A station may detect the loss of a timing source and notify the network. The station may also provide a timing drift value. A network entity may be configured to determine a positioning method based on the timing source outage. Timing sensitive methods, such as time of arrival methods, may be replaced by timing robust methods, such as round trip time measurements, which are less dependent on synchronized station times. Positioning reference signals transmitted by the impacted station may be muted or excluded. The positioning method and timing source outage information may be propagated through the network. Position estimates based on positioning reference signals may be improved. Other capabilities may be provided and not every implementation according to the disclosure must provide any, let alone all, of the capabilities discussed.

DETAILED DESCRIPTION

Techniques are discussed herein for handling positioning sessions in response to a timing source outage. In general, different communication networks and various features within the communication networks may require synchronization among the base stations. For example, LTE may utilize synchronous and asynchronous base stations. 5G-NR networks may utilize system frame number (SFN) synchronization in Time Division Duplex (TDD) deployments. Some terrestrial navigation techniques such as Time of Arrival (ToA) and Time Difference of Arrival (TDoA) require that a positioning computation node (e.g., network entity) be aware of synchronization offsets between the nodes transmitting positioning reference signals. Thus, each station must be capable of receiving signals from a timing source to maintain the timing synchronization. Some stations may utilize the timing signals associated with Global Navigation Satellite Systems (GNSS) to maintain a synchronized time.

GNSS systems are subject to outages for many reasons. For example, local outages may occur due to the presence of a local jammer or a failure/degradation in the receive chain of a GNSS receiver. Global outages, such as with large scale jamming, solar activity, or satellite malfunctions may also cause a station to lose GNSS timing information.

The techniques provided herein enable robust terrestrial positioning methods in response to timing source outages. For example, a base station may be configured to detect a timing outage based on GNSS signal decode failures. A mobile device may be configured to detect a timing outage based on positioning reference signals transmitted from a base station suffering the timing source outage. A location server may be configured to modify positioning reference signal resource sets based on a timing source outage. Base stations affected or impacted by a timing source outage may be excluded and/or configured to mute positioning reference signals during the outage. The location server may initiate timing-robust positioning methods (e.g., asynchronous methods) to reduce the impact of the timing outage. A base station may provide timing drift information in response to a timing source outage. These techniques and configurations are examples, and other techniques and configurations may be used.

Figure 1:
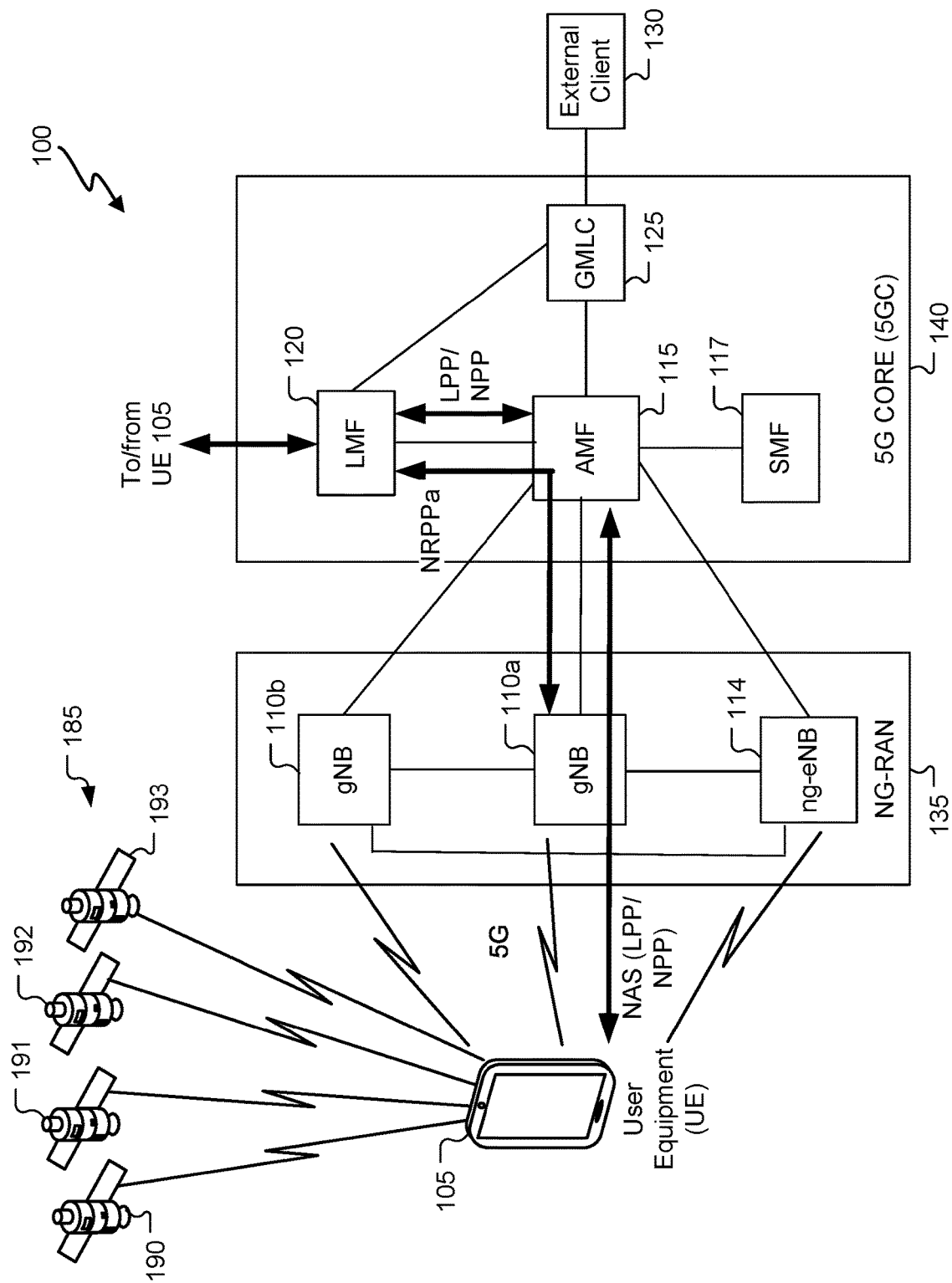
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs 110*a*, 110*b*, 114 may each comprise one or more TRPs. For example, each sector within a cell of a BS may comprise a TRP, although multiple TRPs may share one or more components (e.g., share a processor but have separate antennas). The system 100 may include macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
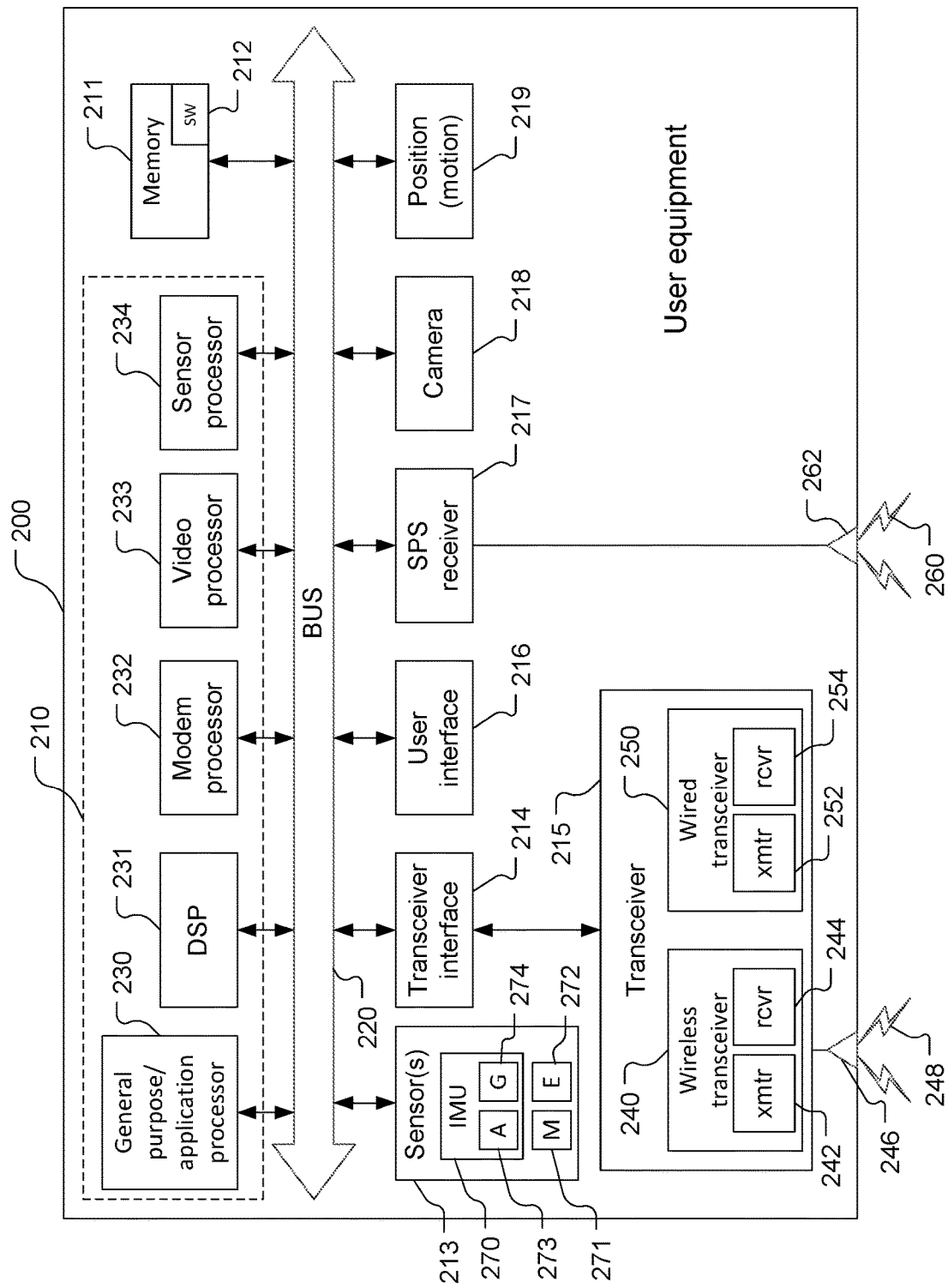
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), V2C (Uu), IEEE 802.11 (including IEEE 802.11p), WiFi, WiFi Direct (WiFi-D), Bluetooth®, Zigbee etc. NR systems may be configured to operate on different frequency layers such as FR1 (e.g., 410-7125 MHz) and FR2 (e.g., 24.25-52.6 GHz), and may extend into new bands such as sub-6 GHz and/or 100 GHz and higher (e.g., FR2x, FR3, FR4). The wired transceiver 250 may include a transmitter 252 and a receiver 254 configured for wired communication, e.g., with the network 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
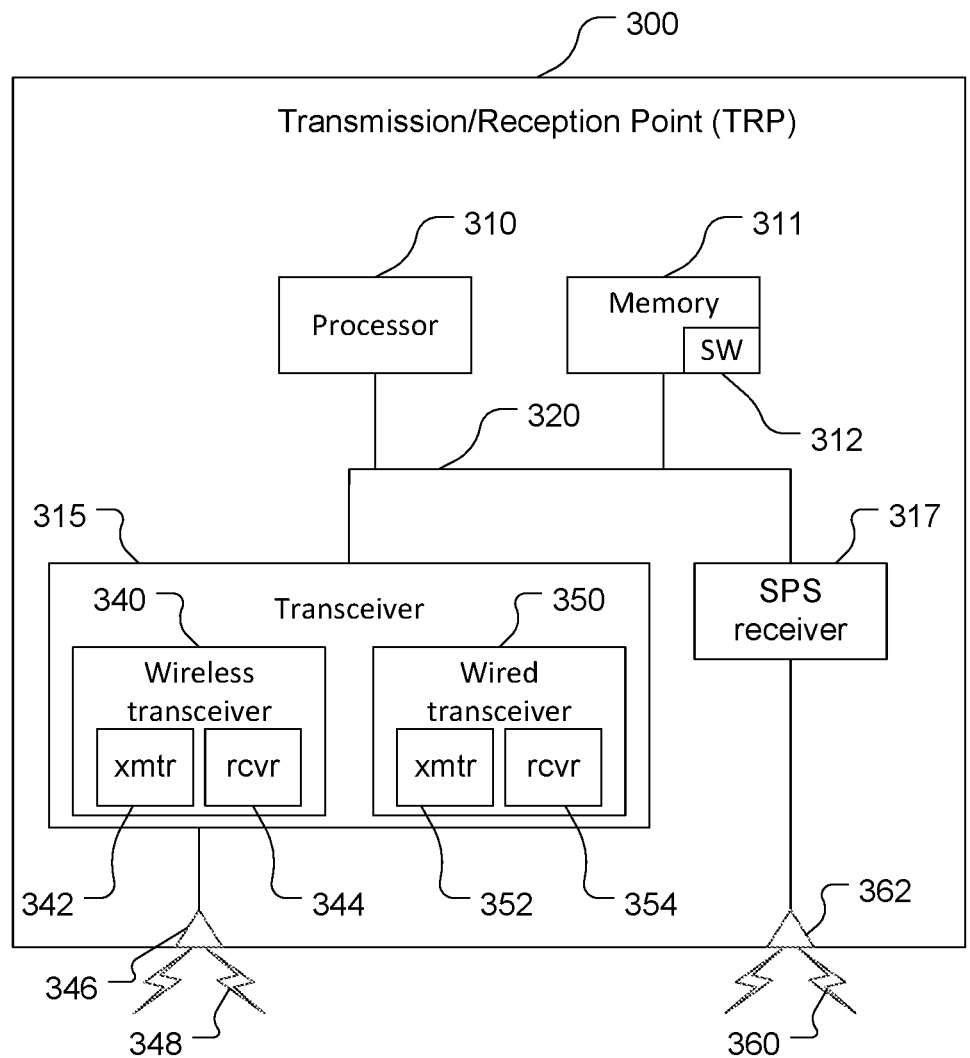
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
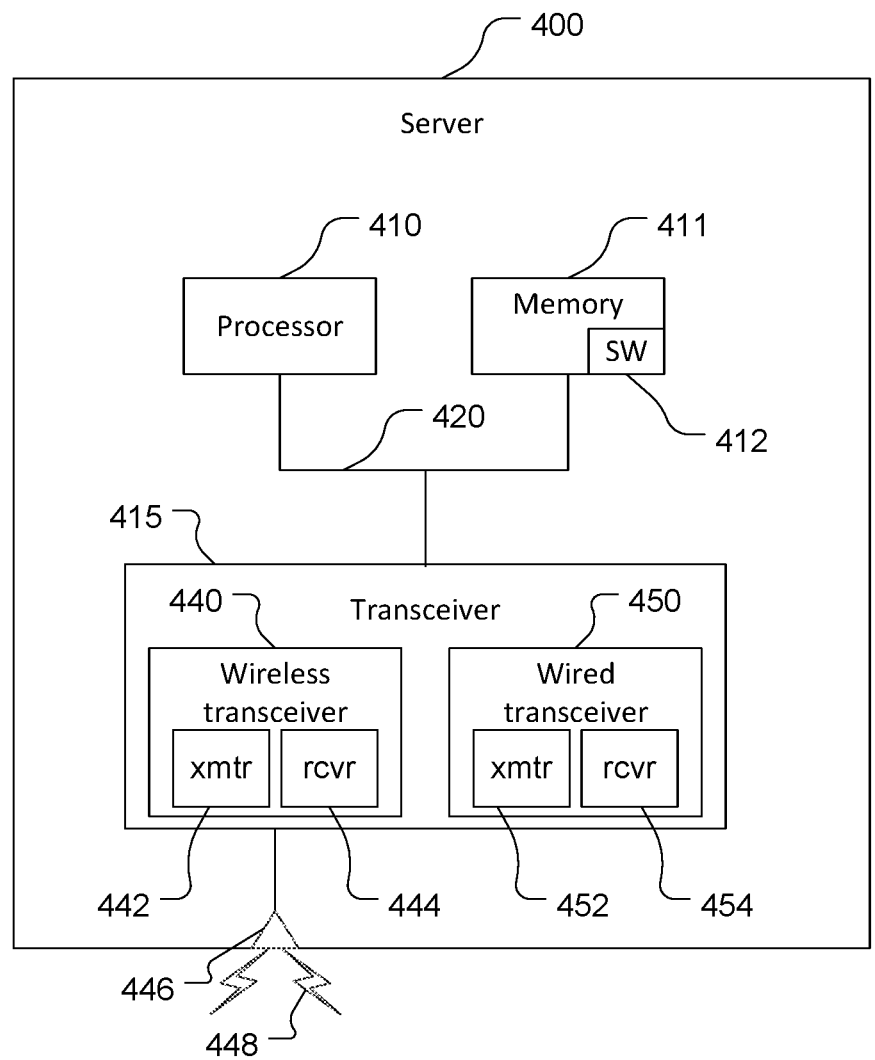
FIG. 4 is a block diagram of components of an example server shown in FIG. 1.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figures 5A, 5B:
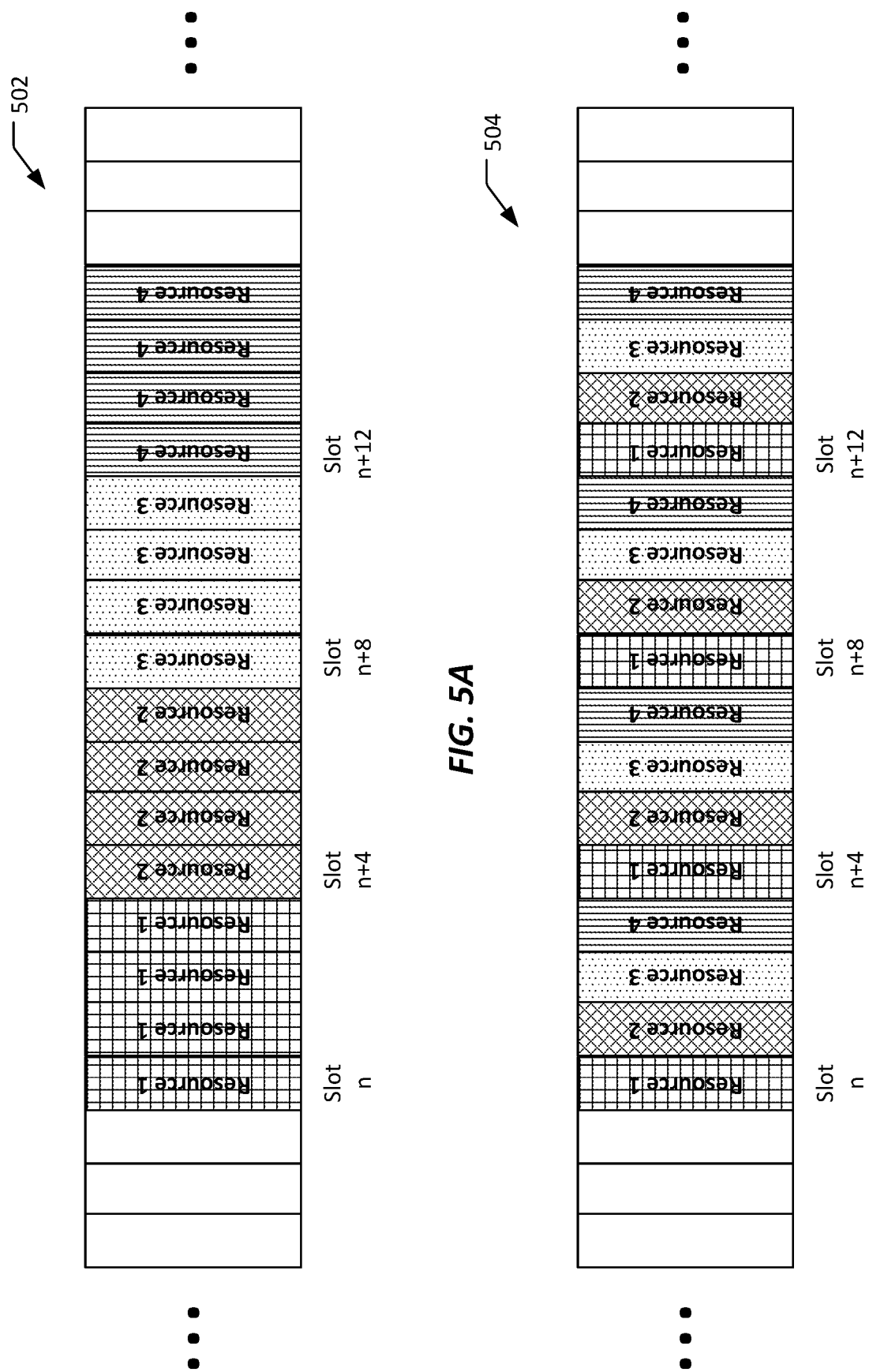
FIGS. 5A and 5B illustrate example downlink positioning reference signal resource sets.

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 6:
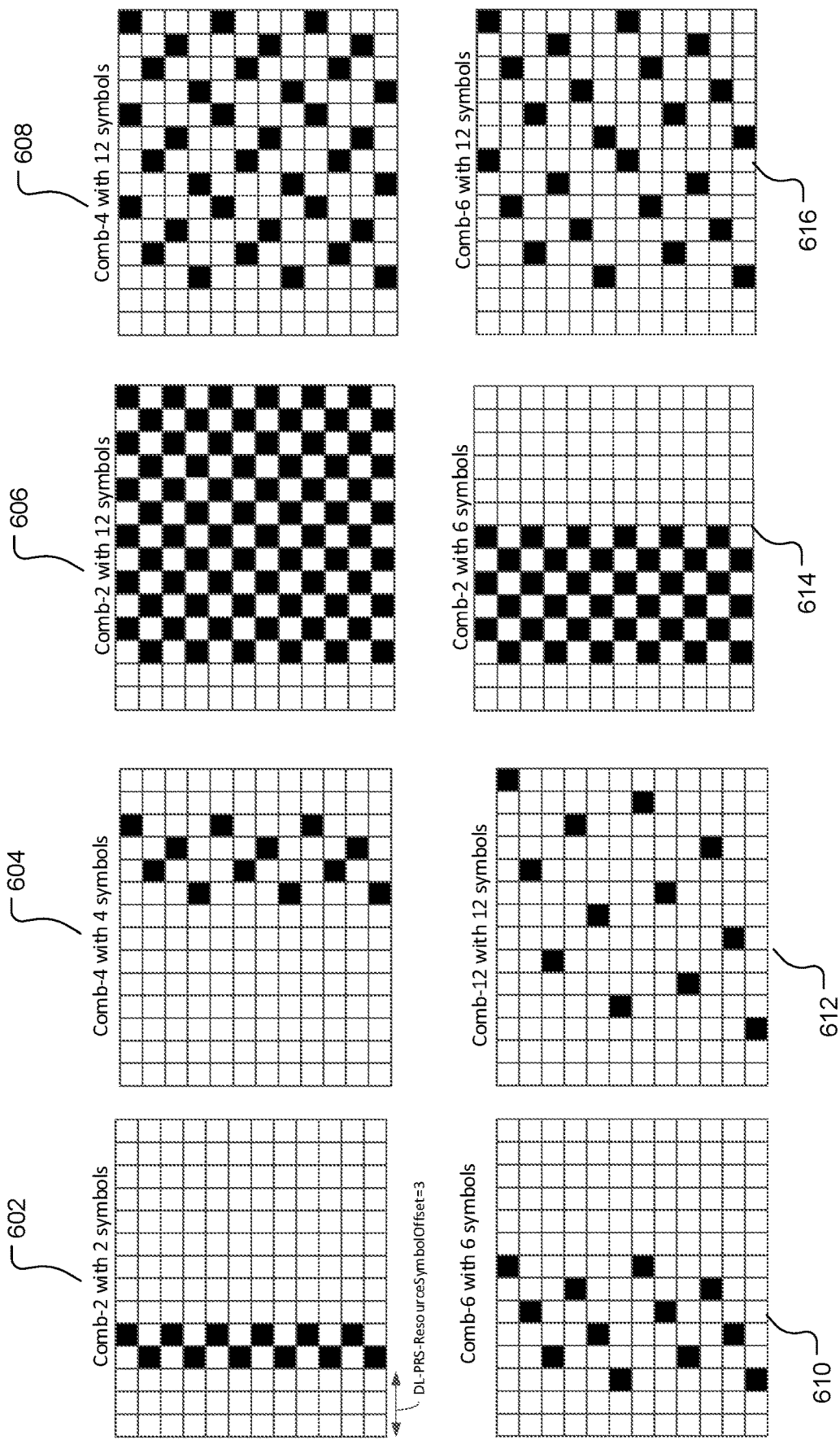
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity TPRS, subframe offset PRS, and PRS duration NPRS. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity TPRS and the subframe offset PRS may be conveyed via a PRS configuration index IPRS. The PRS configuration index and the PRS duration may be configured independently by higher layers. A set of NPRS consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). Each of the PRS resources in the PRS resource set have the same periodicity, a common muting pattern, and the same repetition factor across slots. A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

Figure 7:
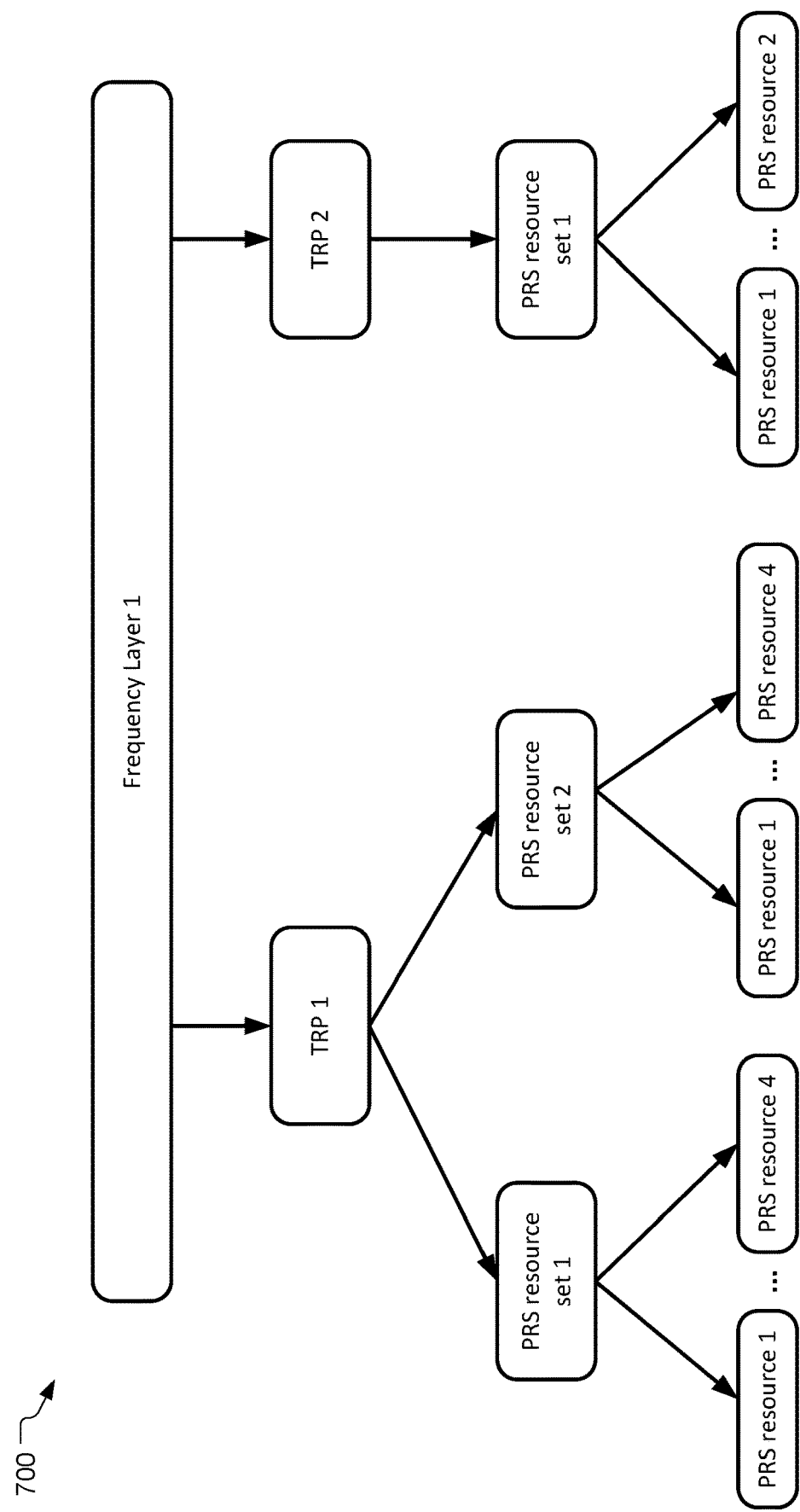
FIG. 7 is a conceptual diagram of an example frequency layer.

Referring to FIG. 7, a conceptual diagram of an example frequency layer 700 is shown. In an example, the frequency layer 700 also referred to as a positioning frequency layer, may be a collection of PRS resource sets across one or more TRPs. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS. Each of the PRS resource sets in the frequency layer 700 is a collection of PRS resources across one TRP which have the same periodicity, a common muting pattern configuration, and the same repetition factor across slots.

Note that the terms positioning reference signal and PRS are reference signals that can be used for positioning, such as but not limited to, PRS signals, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

The ability of a UE to process PRS signals may vary based on the capabilities of the UE. In general, however, industry standards may be developed to establish a common PRS capability for UEs in a network. For example, an industry standard may require that a duration of DL PRS symbol in units of milliseconds (ms) a UE can process every T ms assuming a maximum DL PRS bandwidth in MHz, which is supported and reported by UE. As examples, and not limitations, the maximum DL PRS bandwidth for the FR1 bands may be 5, 10, 20, 40, 50, 80, 100 MHz, and for the FR2 bands may be 50, 100, 200, 400 MHz. The standards may also indicate a DL PRS buffering capability as a Type 1 (i.e., sub-slot/symbol level buffering), or a Type 2 (i.e., slot level buffering). The common UE capabilities may indicate a duration of DL PRS symbols N in units of ms a UE can process every T ms assuming maximum DL PRS bandwidth in MHz, which is supported and reported by a UE. Example T values may include 8, 16, 20, 30, 40, 80, 160, 320, 640, 1280 ms, and example N values may include 0.125, 0.25, 0.5, 1, 2, 4, 6, 8, 12, 16, 20, 25, 30, 32, 35, 40, 45, 50 ms. A UE may be configured to report a combination of (N, T) values per band, where N is a duration of DL PRS symbols in ms processed every T ms for a given maximum bandwidth (B) in MHz supported by a UE. In general, a UE may not be expected to support a DL PRS bandwidth that exceeds the reported DL PRS bandwidth value. The UE DL PRS processing capability may be defined for a single positioning frequency layer 700. The UE DL PRS processing capability may be agnostic to DL PRS comb factor configurations such as depicted in FIG. 6. The UE processing capability may indicate a maximum number of DL PRS resources that a UE can process in a slot under it. For example, the maximum number for FR1 bands may be 1, 2, 4, 6, 8, 12, 16, 24, 32, 48, 64 for each SCS: 15 kHz, 30 kHz, 60 kHz, and the maximum number for the FR2 bands may be 1, 2, 4, 6, 8, 12, 16, 24, 32, 48, 64 for each SCS: 15 kHz, 30 kHz, 60 kHz, 120 kHz.

Figure 8:
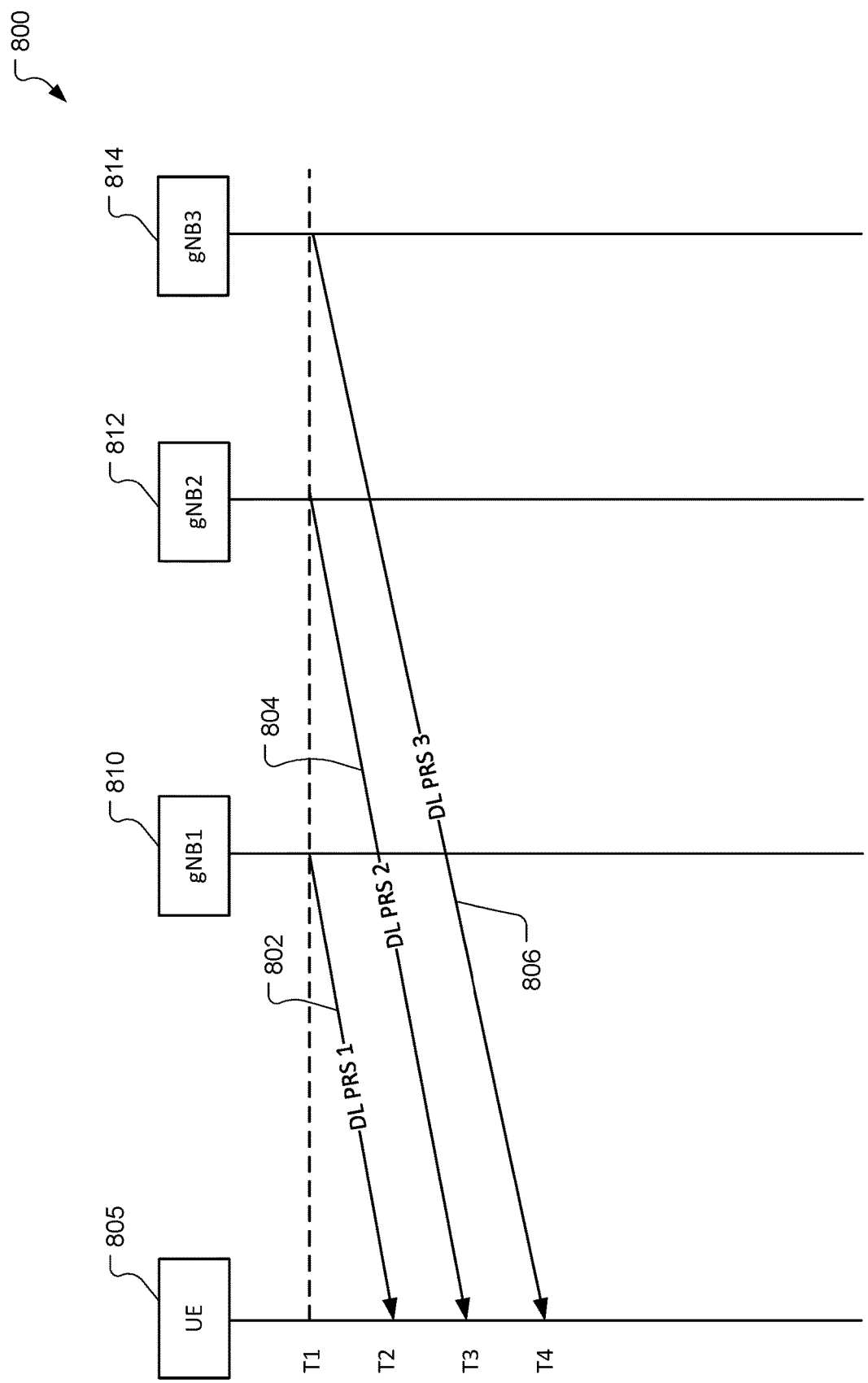
FIG. 8 is an example message flow for a time of arrival based position estimate.

Referring to FIG. 8, an example message flow 800 for time of arrival (ToA) based position flow between a user equipment 805 and a plurality of base stations is shown. The UE 805 is an example of the UE 105, 200 and a first base station 810, a second base station 812 and a third base station 814 are examples of a gNB 110a-b or ng-eNB 114. The number of base stations and message formats in the message flow 800 are examples and not limitations as other numbers and formats may be used. ToA based positioning methods utilize the precise measurements of the arrival time of signals transmitted from one or more base stations to a user equipment, or vise versa. For example, the first base station 810 may be configured to transmit a first DL PRS 802 at time T1, the second base station 812 may be configured to transmit a second DL PRS 804 at time T1, and the third base station 814 may be configured to transmit a third DL PRS 806 at time T1. The transmit times and signal format are examples to describe the concepts of ToA lateration techniques. The distance between the UE 805 and the respective base stations 810, 812, 814 is based on the propagation time of the respective PRS signals 802, 804, 806. That is, the signals travel with a known velocity (e.g., approximately the speed of light (c) or −300 meters per microsecond), and the distance can be determined from the elapsed propagation time. ToA based positioning requires precise knowledge of the transmission start time(s), and that all stations are accurately synchronized with a precise time source. Using the propagation speed and measured time, a distance (D) between the UE 805 and respective base station may be expressed as:

$$D = c^*(t) \quad (1)$$

where:
D=distance (meters);
c=propagation speed of 300 meters/microsecond;
t=time in microseconds.

For example, the distance between the UE 805 and the first base station 810 is c*(T2−T1), the distance between the UE 805 and the second base station 812 is c*(T3−T1), and the distance between the UE 805 and the third base station 814 is c*(T4−T1). The stations may use other transmission times (i.e., not all stations must transmit at time T1). Using the respective distances as a radius, a circular representation of the area around the base stations may be used to determine a position estimate for the UE 805 (e.g., using trilateration). Additional stations may be used (e.g., using multi-lateration techniques). ToA positioning methods may be used for two-dimensional as well as three-dimensional position estimates. Three-dimensional resolution can be performed by constructing spherical instead of circular models.

A drawback of ToA positioning methods is the requirement for precise time synchronization of all stations. Even small issues with time synchronization may result in very large errors in the resulting positioning estimates. For example, a time measurement error as small as 100 nanoseconds can result in a localization error of 30 meters. ToA-based positioning solutions are particularly susceptible to outages in station timing sources which may cause a base station to lose time synchronization. Other positioning techniques, such as round trip timing (RTT) and Angle of Arrival (AoA) are less dependent on station time synchronization.

Figure 9:
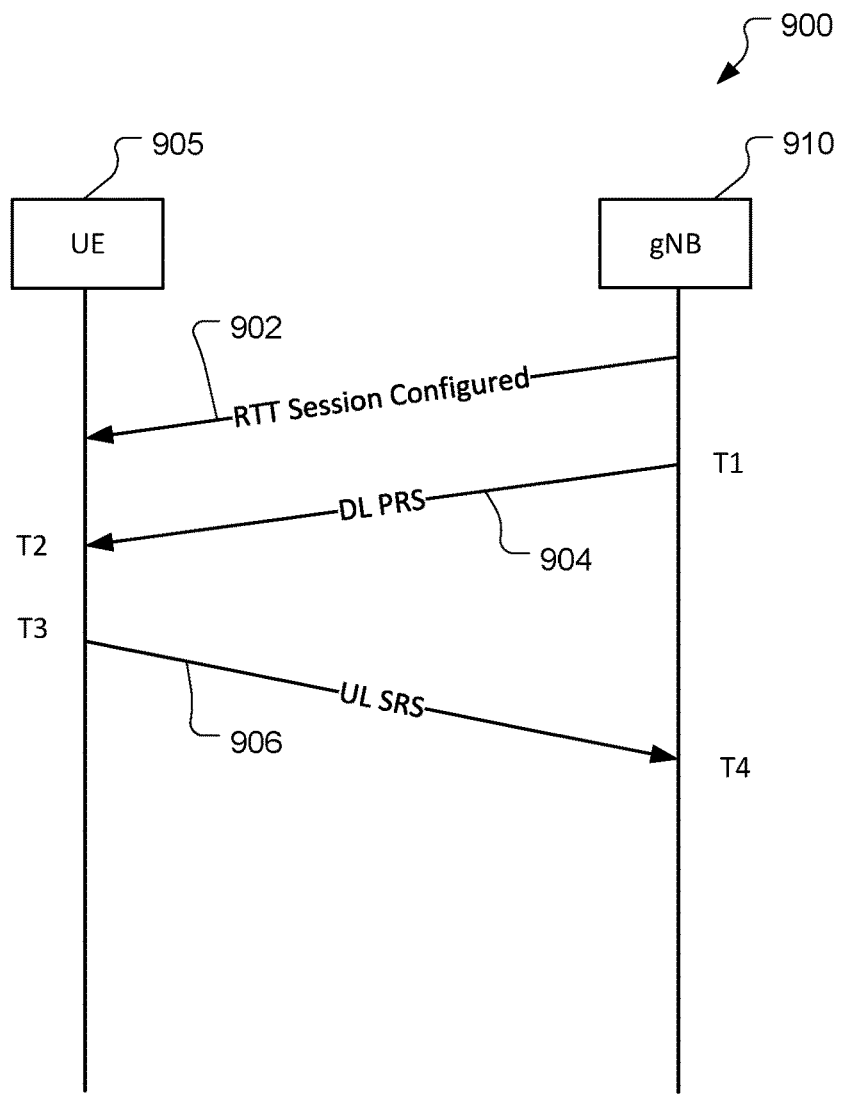
FIG. 9 is an example round trip time message flow between a user equipment and a base station.

Referring to FIG. 9, an example round trip message flow 900 between a user equipment 905 and a base station 910 is shown. The UE 905 is an example of the UE 105, 200 and the base station 910 may be a gNB 110*a-b* or ng-eNB 114. In general, RTT positioning methods utilize a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. The example message flow 900 may be initiated by the base station 910 with a RTT session configured message 902. The base station may utilize the LPP/NRPPa messaging to configure the RTT session. At time T1, the base station 910 may transmit a DL PRS 904, which is received by the UE 905 at time T2. In response, the UE 905 may transmit a Sounding Reference Signal (SRS) for positioning message 906 at time T3 which is received by the base station 910 at time T4. The distance between the UE 905 and the base station 910 may be computed as:

$$\text{distance} = \frac{c}{2}((T4 - T1) - (T3 - T2)) \quad (2)$$

where c = speed of light.

Since the UE 905 and base station 910 are exchanging messages, which may include timing information, the impact of a timing offset between the stations may be minimized. That is, the RTT procedures may be used in asynchronous networks. A drawback to RTT procedures, however, is that in dense operating environments, where there are many UEs exchanging RTT messages with base stations, the bandwidth required for the UL SRS for positioning messages may increase the messaging overhead and utilize excess network bandwidth. In this use case, passive positioning techniques may reduce the bandwidth required for positioning by eliminating transmissions from the UE.

Figure 10:
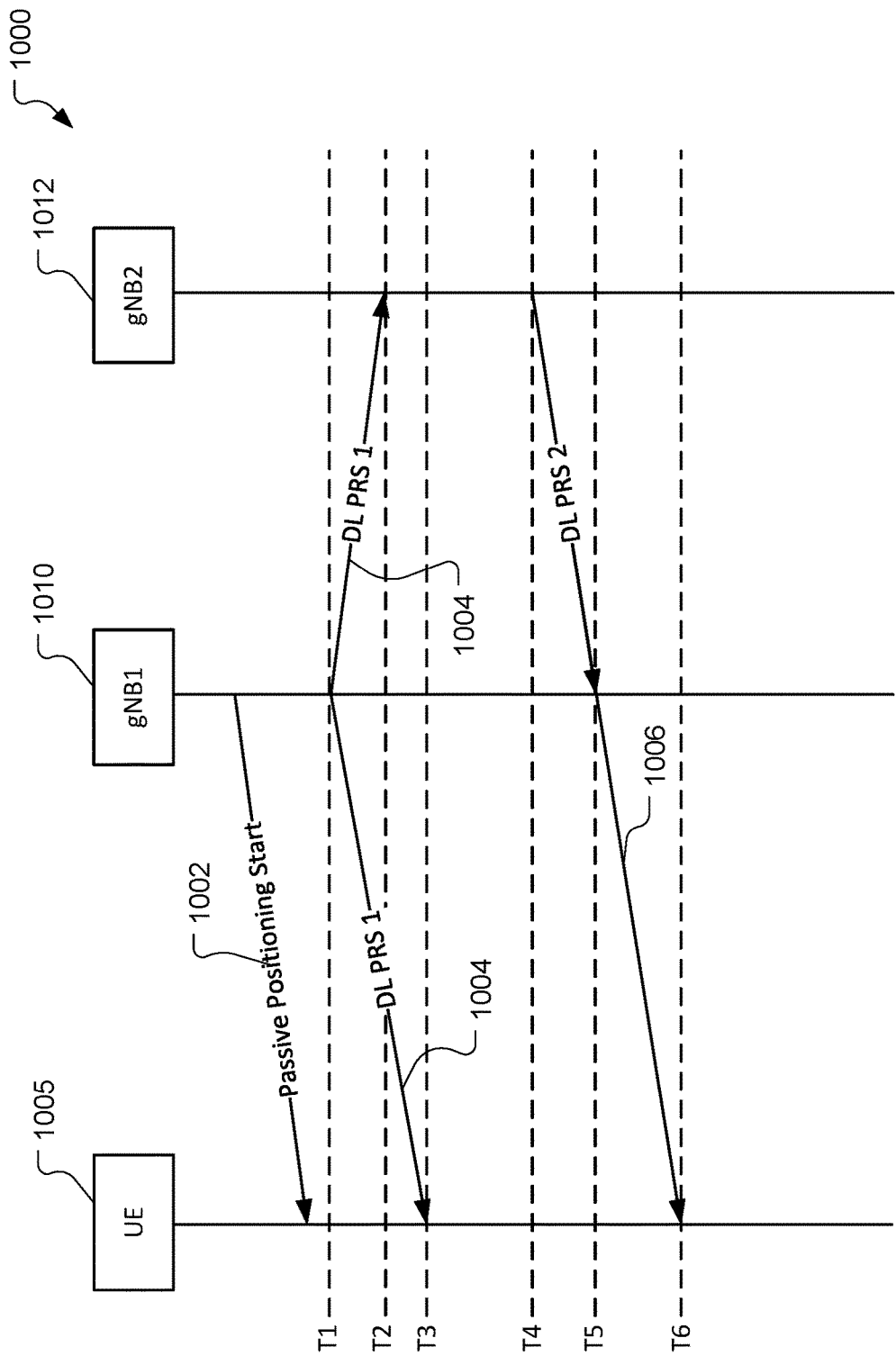
FIG. 10 is an example message flow for passive positioning of a user equipment.

Referring to FIG. 10, an example message flow 1000 for passive positioning of a user equipment 1005 is shown. The message flow includes the UE 1005, a first base station 1010 and a second base station 1012. The UE 1005 is an example of the UEs 105, 200, and the base stations 1010, 1012 are examples of the gNBs 110*a-b* or ng-eNB 114. In general, TDOA positioning techniques utilize the difference in travel times between one entity and other entities to determine relative ranges from the other entities and those, combined with known locations of the other entities, may be used to determine the location of the one entity. Angles of arrival and/or departure may be used to help determine a location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). In operation, the first base station 1010 may provide a passive positioning start message 1002 to the UE 1005. The passive positioning start message 1002 may be a broadcast message, or other signaling such as RRC, to inform the UE of a PRS transmission schedule and may include transmission information (e.g., channel information, muting patterns, PRS bandwidth, PRS identification information, etc.). At time T1, the first station may transmit a first DL PRS 1004 which may be received by the second base station 1012 at time T2 (for example), and by the UE 1005 at time T3. The second base station 1012 may be configured to transmit a second DL PRS 1006 at time T4, which is received by the first base station 1010 at time T5 and by the UE 1005 at time T6. The time between T2 and T4 may be a configured turnaround time on the second base station 1012 and thus a known period of time. The time between T1 and T2 (i.e., time of flight) may also be known because the first and second base stations 1010, 1012 are in fixed locations. The turnaround time (i.e., T4−T2) and the time of flight (i.e., T2−T1) may be broadcast or otherwise provided to the UE 1005 for use in positioning calculations. The UE 1005 may observe the difference between T6 and T3, and the distances may be computed as:

$$D_{gNB1-UE} = \frac{c}{2}((T_3 - T_1)) \quad (3)$$

$$D_{gNB2-UE} = \frac{c}{2}((T_6 - T_1) - (T_4 - T_2) - (T_2 - T_1)) = \frac{c}{2}(T_6 - T_4) \quad (4)$$

$$D_{gNB2-UE} - D_{gNB1-UE} = \frac{c}{2}((T_6 - T_3) - (T_4 - T_2) - (T_2 - T_1)) \quad (5)$$

In operation, in an example, the base stations 1010, 1012 may utilize synchronized timing to compute the time of flight values. In an example, the first DL PRS 1004 and the second DL PRS 1006 may include timing information (such as in the RTT message flow 900) and thus may reduce the impact of a timing offset between the stations.

Figure 11A:
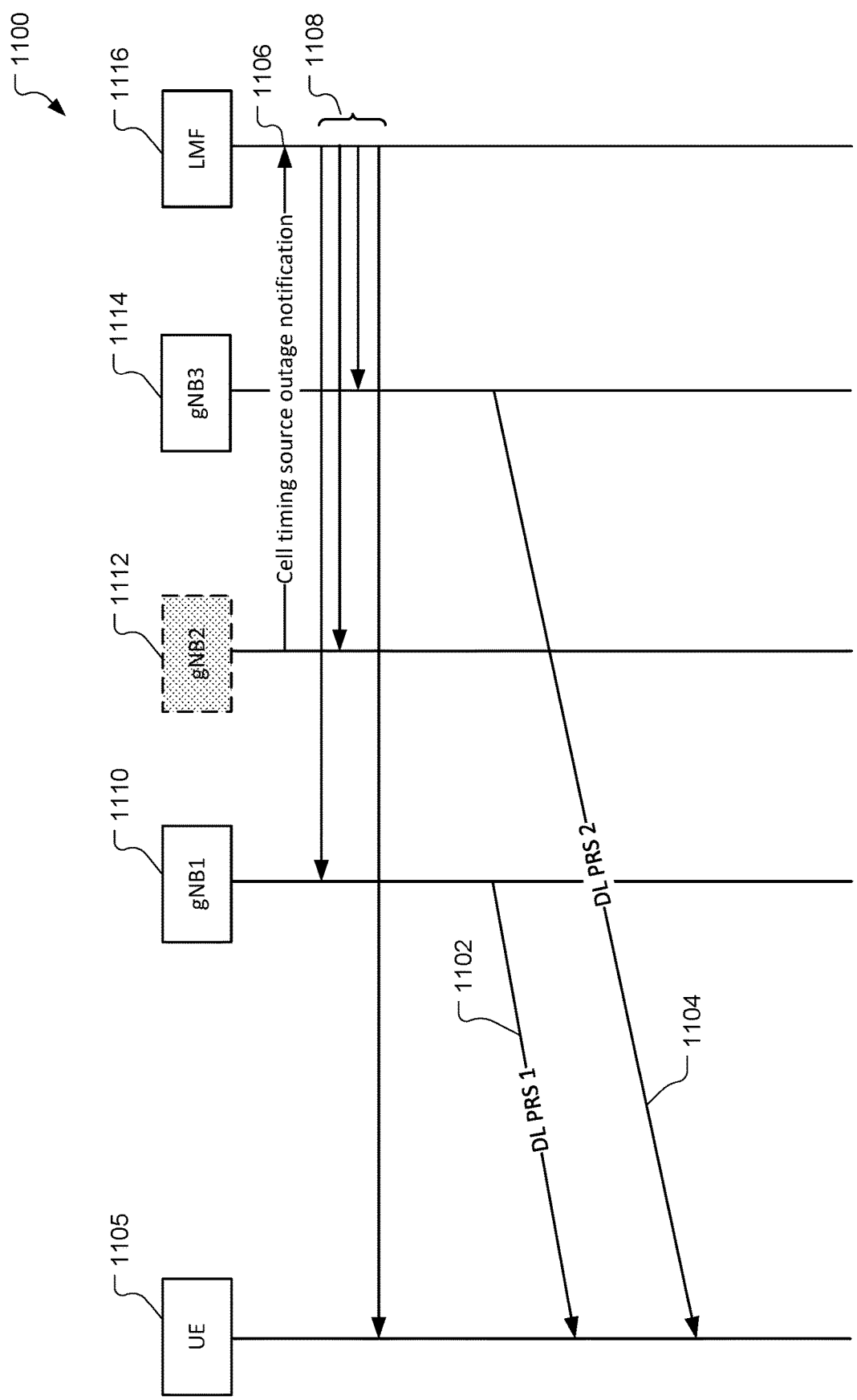
FIGS. 11A-11C are example message flows based on detected timing source outages.

Referring to FIG. 11A, a first example message flow 1100 in reaction to a timing source outage is shown. The message flow 1100 may be based on the communication system 100 and includes the UE 1105, a first base station 1110, a second base station 1112, and a third base station 1114. The UE 1105 and base stations 1110, 1112, 1114 are configured to communicate with a network server such as an LMF 1116. The UE 1105 is an example of the UEs 105, 200, the base stations 1110, 1112, 1114 are examples of a TRP 300 such as the gNBs 110*a-b* or ng-eNB 114, the LMF 1116 is an example of a network server 400 such as the LMF 120. In general, the message flow enables propagation of information and processes when a network station has incurred a timing source outage, For example, the second base station 1112 may detect a timing outage based on the loss of GNSS signals. Based on the detection of the timing source outage, the second base station 1112 may provide one or more cell timing source outage notification messages 1106 to the LMF 1116. In an example, the cell timing source outage notification messages 1106 may utilize NRPPa protocols, or other network messaging protocols, and is configured to provide an indication of the timing source outage to the LMF 1116. In an embodiment, other conditions may be evaluated by the second base station to trigger the transmission of the cell timing source outage notification messages 1106. For example, when the second base station 1112 is transmitting or receiving PRS from the UE 1105, or when the second base station 1112 is active, or recently concluded, a positioning session. Other trigger condition include when the second base station 1112 receives a request for on-demand PRS, or when the LMF 1116 is co-located with the second base station 1112, or when the second base station 1112 receives an indication of a timing source outage from another station. In an example, the second base station 1112 may be configured to send an SFN initialization time to the LMF 1116 which may be used to compute round trip delays (RTDs) between the base stations. An 'error indicator/field' in the SFN initialization time and/or RTDs may be used to indicate loss of cell timing. In an embodiment, the cell timing source outage notification messages 1106 may indicate one or more RTD drift rates. For example, a first timing drift rate may be associated with normal operation (i.e., when a timing source is available), and additional timing drift rates based on factors associated with a timing source outage (e.g., based on how many GNSS/satellites are associated with the outage). These conditions are examples, and not limitations, as other trigger conditions may be used to prompt the transmission of the cell timing source outage notification messages 1106. In an example, the cell timing source outage notification message 1106 may include an indication of a timing drift rate to enable the LMF 1116 to estimate a signal timing error and/or exclude measurements if the drift rate exceeds a threshold value.

The LMF 1116 may be configured to determine and propagate mitigation actions in response to the timing source outage at the second base station 1112. For example, the LMF 1116 may notify other network stations (e.g., the UE 1105 and other base stations 1110, 1114) via one or more timing outage response messages 1108 to perform mitigating actions. In an example, the timing outage response messages 1108 may be provided to the base stations 1110, 1112, 1114 via NRPPa messaging, and to the UE 1105 (and other UE's not shown in FIG. 11A) via LPP messaging. The actions may include, for example, muting the PRS on the second base station 1112 and modifying PRS resource allocations on other stations in the network (e.g., the other stations may use the resources previously allocated to the second base station 1112). The response message 1108 may inform the other network stations to exclude the second base station 1112 from future ToA or TDoA positioning transmissions until the timing source is restored. The response messages 1108 may be configured to instruct one or more of the network stations to utilize a more robust positioning method (e.g., change from ToA or TDoA to RTT and/or AoA/AoD measurements). For example, RTT is less sensitive to inter-gNB time synchronization issues because it allows each gNB to use an internal clock to measure the TOAs for the RxTx measurement. During a timing source outage, however, a gNB's internal clock may have increased drift which may corrupt the timing measurements. In an embodiment, the second base station 1112 may indicate this timing drift rate with and without the timing outage, and the UE 1105 may be configured to exclude the measurements if the drift rate exceeds a threshold. The threshold value may depend on the target accuracy of the positioning session. Angle measurement positioning methods (e.g., AoD/AoA) may also be less sensitive to inter-gNB time synchronization issues, but high clock drift values may increase the difficulty for tracking PRS from the second base station 1112 (i.e., a gNB suffering a timing source outage). For example, an expected DL PRS may have an expected RSTD value and its uncertainty can be increased based on an increased drift rate value, and/or more PRS may be configured (e.g., with different beams, or with more symbol and/or slot-level repetition) to enhance this tracking. In an embodiment, if the drift rate value is too large, the LMF 1116 may disable or mute the PRS resources on the second base station 1112. For example, the first base station 1110 may transmit a first DL PRS 1102 and the third base station 1114 may transmit a second DL PRS 1104. The second base station 1112 does not transmit a DL PRS. In an example, the PRS resources may be repurposed for PRS from other network stations, or for data communication. The configuration examples provided for DL PRS may also be applied to UL PRS (i.e., those QCLed with an RS from an affected base station).

Figure 11B:
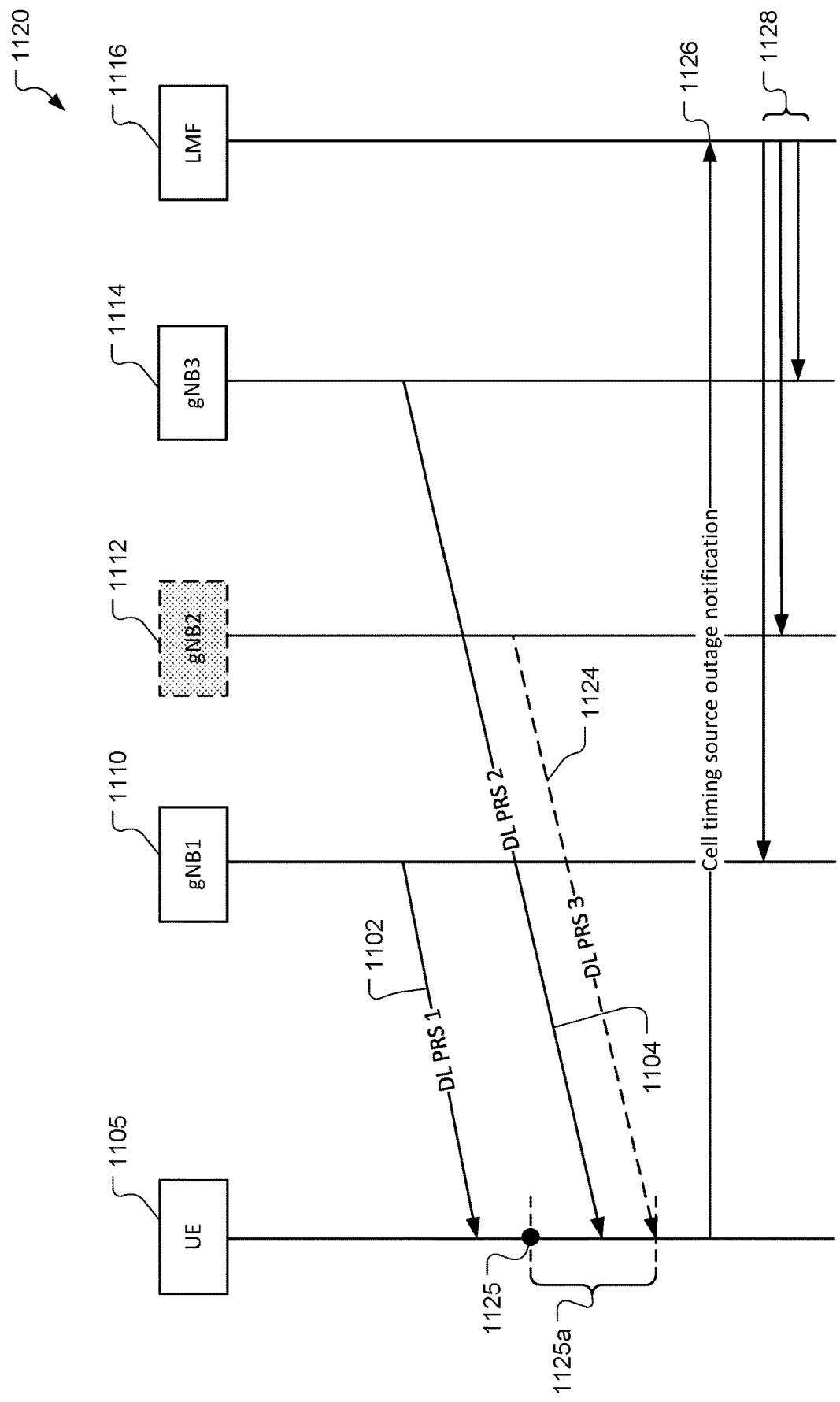

Referring to FIG. 11B, with further reference to FIG. 11A, a second example message flow 1120 in reaction to a timing source outage is shown. The second base station 1112 is experiencing a time source outage but is unaware of a loss of timing synchronization with the other stations in the network. In this example, the second station 1112 transmits a DL PRS 1124 which is received by the UE 1105. The UE 1105 may be configured to receive the DL PRS 1124 at an expected arrival time 1125. The expected arrival time may be based on a drift rate value associated with the second base station 1112. In an example, an arrival error 1125*a* may be determined based on the expected arrival time 1125 and the actual arrival time of the DL PRS 1124. The arrival error 1125*a* may also be based on a positioning accuracy, and the range measurement based on the DL PRS 1124 may exceed a threshold when compared to a position estimate based on DL PRSs received from other stations (e.g., the first and second DL PRS 1102, 1104). The UE 1105 may be configured to transmit, to the LMF 1116, one or more cell timing source outage notification messages 1126 based on the detection of the arrival error 1125*a* associated with the DL PRS 1124. In response, the LMF 1116 is configured to notify other network stations (e.g., other UEs (not shown in FIG. 11B), and the base stations 1110, 1112, 1114) via one or more timing outage response messages 1128 (e.g., NRPPa, LPP) to perform mitigating actions such as described in FIG. 11A.

Figure 11C:
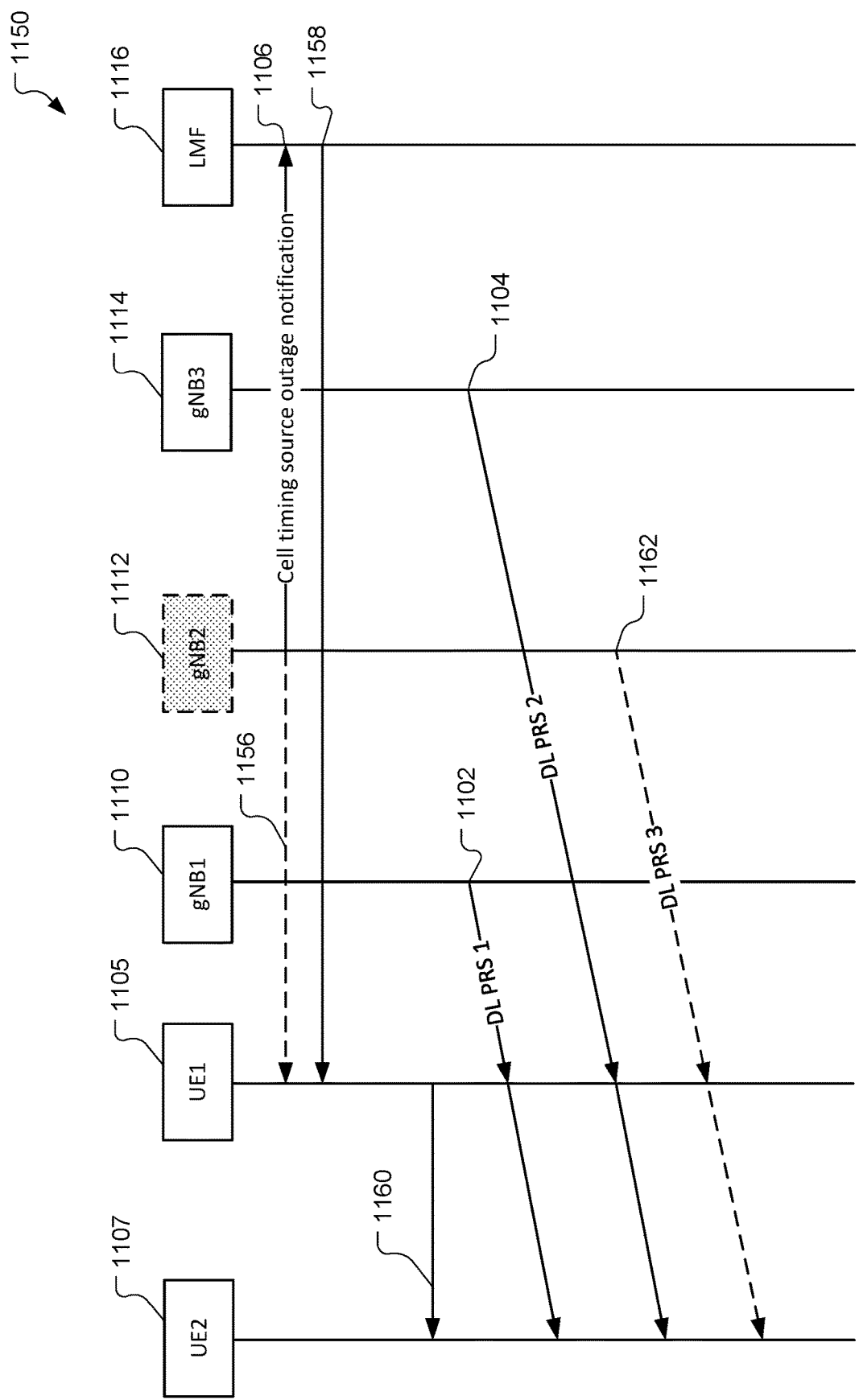

Referring to FIG. 11C, with further reference to FIGS. 11A and 11B, a third example message flow 1150 in reaction to a timing source outage is shown. The second base station 1112 is aware that it is experiencing a timing source outage and may send one or more cell timing source outage notification messages 1106 to the LMF 1116. In an example, the LMF 1116 may be configured to notify other network stations via one or more timing outage response messages 1158 to perform mitigating actions. For example, the UE 1105 may receive a timing outage response message 1158. In an embodiment, the second base station 1112 may be configured to send one or more cell timing source outage notification messages 1156 to one or more UEs, such as the UE 1105. The cell timing source outage notification messages 1156 may utilize network message protocols such as Radio Resource Control (RRC), Media Access Control (MAC) Control Elements (CE), or other downlink, uplink or sidelink protocols. The UE 1105 may be configured to determine one or more mitigation actions based on receipt of the cell timing source outage notification messages 1156. For example, the actions may include excluding PRS transmitted from the second base station 1112 (i.e., the third DL PRS 1162) from future ToA or TDoA positioning transmissions until the timing source is restored. The UE 1105 may be configured to utilize a more robust positioning method (e.g., change from ToA or TDoA to RTT and/or AoA/AoD measurements). In an example, the one or more cell timing source outage notification messages 1156 and/or the one or more timing outage response messages 1158 may include a timing drift rate for the affected station (e.g., the UE 1105 may be configured to apply a drift rate to the third DL PRS 1162). The UE 1105 may be configured to perform other mitigation actions upon receipt of one or more cell timing source outage notification messages 1156 from a base station and/or the one or more timing outage response messages 1158 from another network station, such as the LMF 1116.

In an embodiment, the first UE 1105 may receive the cell timing source outage notification messages 1156 and is configured to provide the corresponding outage and drift rate information to one or more additional UEs, such as a second UE 1107, via one or more sidelink messages 1160. The sidelink messages may utilize one or more sidelink schemes for resources such as the physical sidelink control channel (PSCCH), the physical sidelink shared channel (PSSCH), V2X PC5, or other sidelink technologies and protocols. The sidelink messages 1160 may be used to propagate the one or more cell timing source outage notification messages 1156 and/or the timing outage response messages 1158. For example, the one or more sidelink messages 1160 may be configured to enable the second UE 1107 to apply a drift rate to the third DL PRS 1162, to ignore the third DL PRS, to utilize a different positioning method (e.g., AoA, RTT, ECID, etc.), and/or other mitigating actions provided by the LMF 1116, or another network resource.

In an embodiment, an LMF (e.g., the LMF 1116) may be collocated with a gNB (e.g., the second base station 1112) to reduce the latency in LPP and improve positioning metrics (e.g., time to first fix (TTFF/TFF)). The gNB may be a serving gNB of a UE being positioned or a neighboring gNB. If the collocated gNB suffered a timing outage, it may be desirable to move the LMF to another gNB if the LMF is also suffering from the timing outage. If UEs connected to the gNB are made to handover to avoid the outage, their LMF could be moved to their new serving cell (i.e., if the new serving gNB has a collocated LMF). In an example, an AMF may utilize the timing source status of a gNB when determining when and how to transfer a LMF (i.e., LMFs should not be co-located with gNB suffering timing source outages). Other LMF switching procedures may be used in view of base stations experiencing timing source outages.

Figure 12:
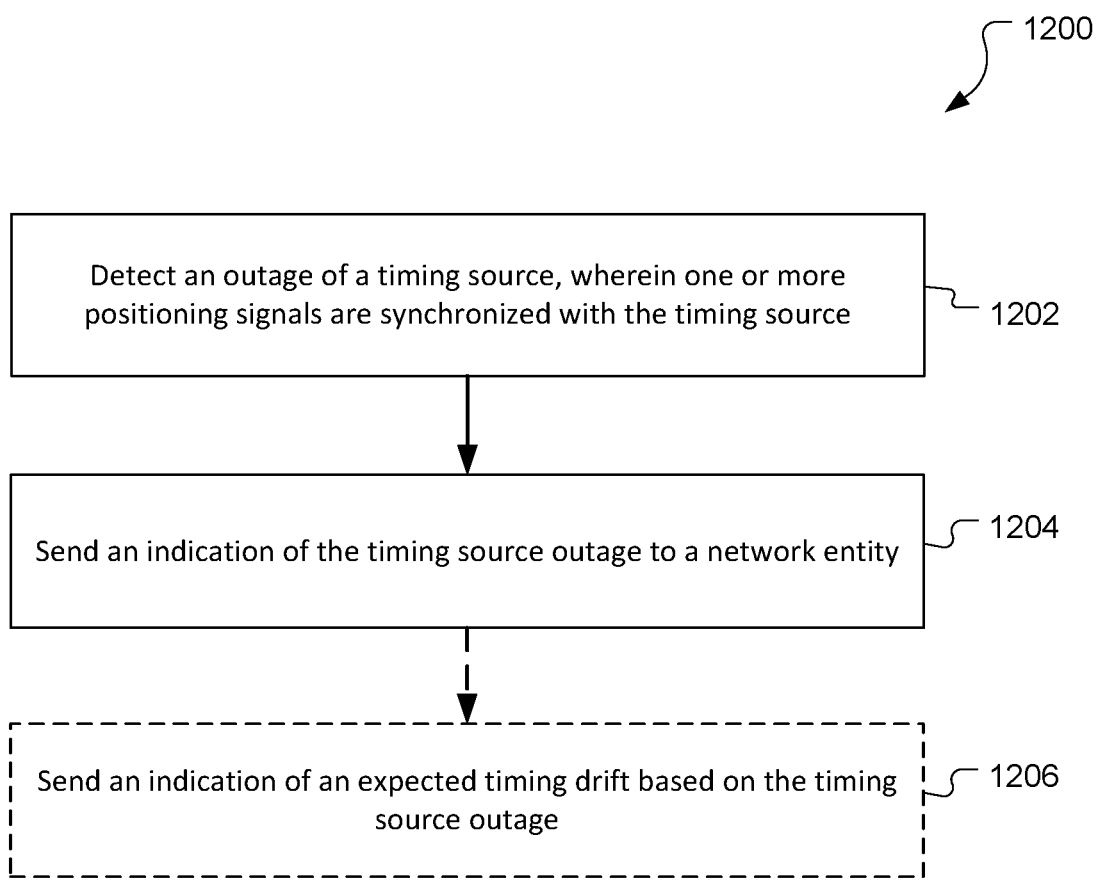
FIG. 12 is a process flow for an example method for providing an indication of a timing source outage to a network entity.

Referring to FIG. 12, with further reference to FIGS. 1-11C, a method 1200 for providing an indication of a timing source outage to a network entity includes the stages shown. The method 1200 is, however, an example and not limiting. The method 1200 may be altered, e.g., by having stages added, removed, rearranged, combined, performed concurrently, and/or having single stages split into multiple stages. For example, sending an indication of a timing drift at stage 1206 is optional, or may be combined with sending an indication of a timing source outage at stage 1204.

At stage 1202, the method includes detecting an outage of a timing source, wherein one or more positioning signals are synchronized with the timing source. A TRP 300 and/or a UE 200 are example means for detecting an outage of a timing source. A network station, such as a base station or UE may utilize a synchronized time to transmit positioning signals such as PRS and SRS. In an example, a base station such as a gNB 110*a* may be configured to detect the timing outage based on GNSS signal decode failures. That is, the loss of timing on the base station may cause the decode failures. Local GNSS outages may occur due to the presence of a local jammer or a failure/degradation in the receive chain of a GNSS receiver. Global outages, such as with large scale jamming, solar activity, or satellite malfunctions may also cause a station to lose GNSS timing information. In an example, the UE 1105 may be configured to detect that a base station is suffering a timing source outage based on timing information associated with reference signals. For example, positioning signals from an effected base station may not correlate with positioning signals received from other stations. Other timing sources may also be used with future networks, such as local timing beacons. The loss of a beacon signal may also be considered an outage of a timing source.

At stage 1204, the method includes sending an indication of the timing source outage to a network entity. The UE 200 and the TRP 300 are example means for sending an indication of the timing source outage. The indication is configured to inform the receiving network entity that the base station is experiencing a timing source outage. In an example, the base station experiencing the timing source outage at stage 1202 may utilize network protocols such as NRPPa to provide one or more cell timing source outage notification messages 1106 to a network entity such as the LMF 1116. The LMF 1116 may determine one or more mitigation actions upon receipt of the indication of the timing source outage. In an example, the base station may send cell timing source outage notification messages 1156 to one or more UEs via wireless protocols such as RRC, MAC-CE, DCI, etc. The UEs may be configured to perform one or more mitigation actions and propagate the time source outage information to other stations (e.g., via LPP, sidelink, or other wireless protocols) upon receipt of the indication of the timing source outage. For example, the UE 1105 may be configured to transmit one or more sidelink messages 1160 and/or one or more cell timing source outage notification messages 1126 based on the timing source outage information.

At stage 1206, the method optionally includes sending an indication of an expected timing drift based on the timing source outage. The TRP 300 is a means for sending the timing drift information. The timing drift information is configured to inform the receiving stations of a base station's ability to maintain a constant time. The drift rate may indicate an expected error rate. The timing drift rate may be based on, for example, manufacturing specifications and may have a temperature component (i.e., the drift rate may increase with higher temperatures in base station components). In an example, the timing drift rate may be included in the indication messages provided at stage 1204.

Figure 13:
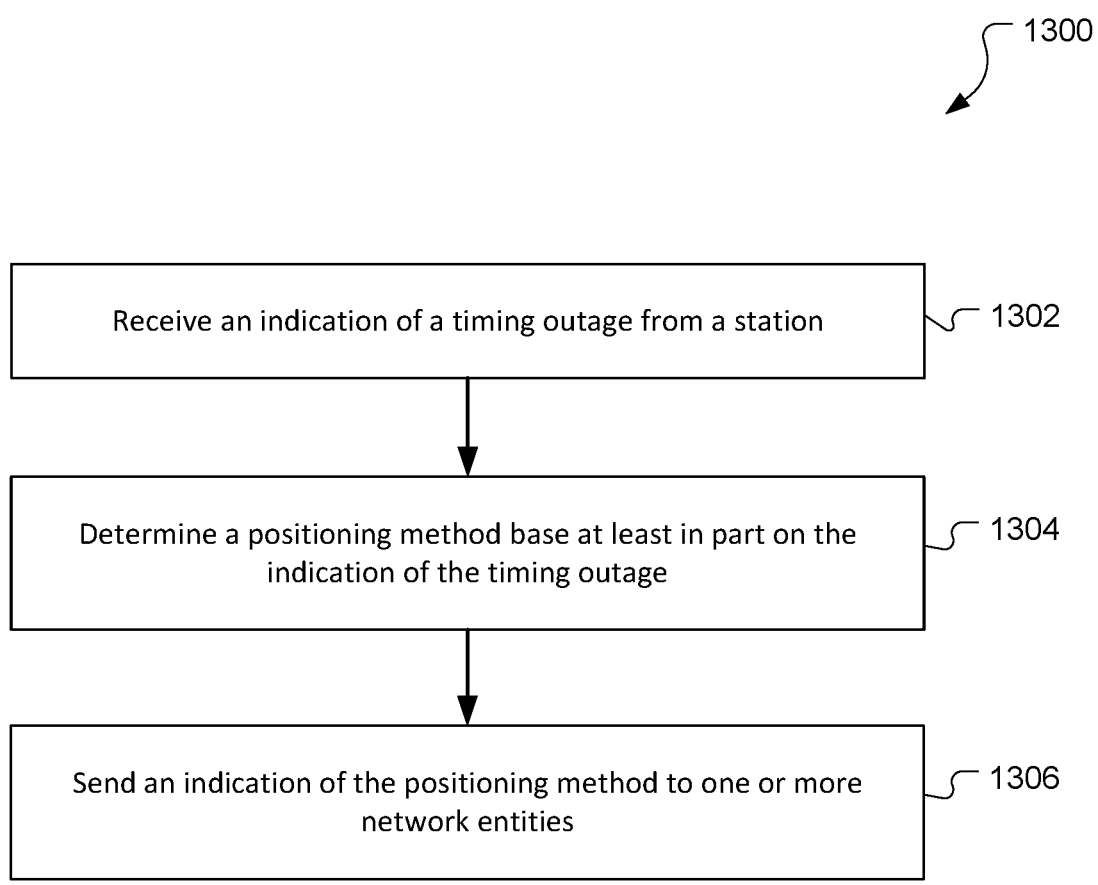
FIG. 13 is a process flow for an example method for configuring a positioning method based on a timing source outage.

Referring to FIG. 13, with further reference to FIGS. 1-11C, a method 1300 for configuring a positioning method based on a timing source outage includes the stages shown. The method 1300 is, however, an example and not limiting. The method 1300 may be altered, e.g., by having stages added, removed, rearranged, combined, performed concurrently, and/or having single stages split into multiple stages.

At stage 1302, the method includes receiving an indication of the timing source outage from a station. A server 400, such as the LMF 120, and a UE 200 are example means for receiving the indication of the timing source outage. In an example, a base station in a network, such as the second base station 1112, may experience a timing source outage and may be configured to send one or more cell timing source outage notification messages 1106, 1156 to one or more network entities. The indication is configured to inform the receiving network entity that the base station is experiencing a timing source outage. In an example, the indication of the timing source outage may utilize network protocols such as NRPPa or other wireless protocols such as RRC, MAC-CE, DCI, etc. In an example, one or more UEs in a network may be configured to propagate the indication of a timing source outage to other stations such as other UEs (e.g., sidelink) and network servers (e.g., LMF 1116).

At stage 1304, the method includes determining a positioning method based at least in part on the indication of the timing outage. The server 400 and the UE 200 are example means for determining a positioning method. Upon receipt of an indication of a timing source outage at stage 1302, the LMF 1116 and/or the UE 1105 may be configured to determine mitigation actions including selecting a positioning method in view of the timing outage. The positioning methods may include muting/excluding reference signals transmitted from the impacted station. Less time synchronization sensitive positioning methods such as RTT, AoA, ECID, etc. may be used in place of ToA and/or TDoA methods. In an example, the indication at stage 1302 may include a timing drift rate associated with the base station and the positioning method may utilize the drift rate (e.g., TDoA with drift rate). Other positioning methods may be selected based on the timing outage information.

At stage 1306, the method includes sending an indication of the positioning method to one or more network entities. The server 400 and the UE 200 are example means for sending an indication of the positioning method. In an example, the LMF 1116 may send the other network entities (e.g., the UEs and base stations) one or more timing outage response messages 1108 via NRPPa and/or LPP messaging. The indication of the positioning method may be, for example, PRS resource sets configured to mute the PRS on the effected base station and modify PRS resource allocations on other stations in the network. The indication of the position method may inform the other network stations to exclude the impacted base station from future ToA or TDoA positioning transmissions until the timing source is restored, or to utilize a more robust positioning method (e.g., change from ToA or TDoA to RTT and/or AoA/AoD or ECID measurements), or to utilize a timing drift rate on signals transmitted by the impacted station. In an embodiment, the indication of the timing outage received at stage 1302 may indicate a timing drift rate value with and without the timing outage, and a network entity may be configured to exclude the measurements if the timing drift rate exceeds a threshold. In an example, the indication of the positioning method may enable a network entity to repurpose PRS from other network stations for data communication. Other assistance data may be included as the indication of the positioning method.

The DL PRS positioning methods are provided as an example, and not a limitation. Other network stations such as UEs may be impacted by a timing source outage and positioning methods associated with UL PRS (e.g. SRS) or other sidelink positioning methods may also be modified based on the timing outage.

Figure 14:
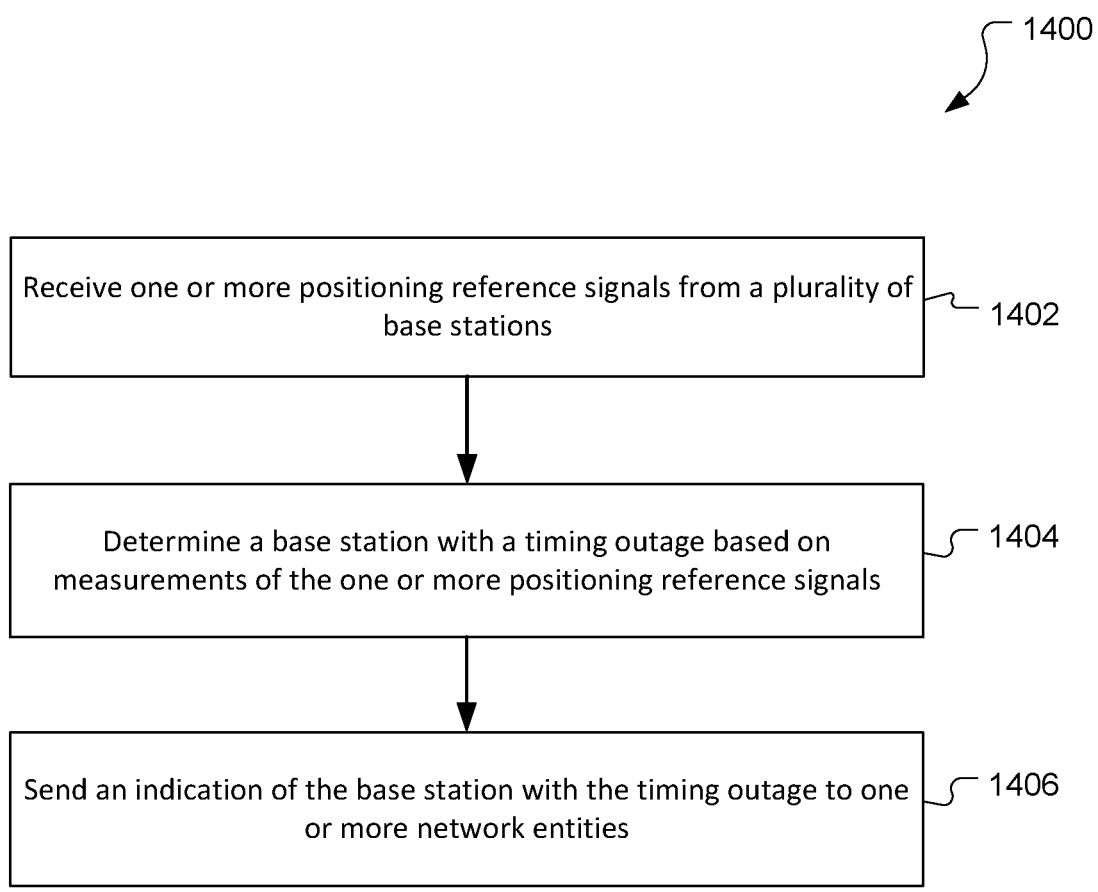
FIG. 14 is a process flow for an example method for detecting a base station incurring a timing source outage.

Referring to FIG. 14, with further reference to FIGS. 1-11C, a method 1400 for detecting a base station incurring a timing source outage includes the stages shown. The method 1400 is, however, an example and not limiting. The method 1400 may be altered, e.g., by having stages added, removed, rearranged, combined, performed concurrently, and/or having single stages split into multiple stages.

At stage 1402, the method includes receiving one or more positioning reference signals from a plurality of base stations. A UE 200 is a means for receiving one or more PRS. In an example, one or more base stations such as the base stations 1110, 1112, 1114 may transmit PRS resources based on a PRS frequency layer. The PRS schedule may be provided to a UE via assistance data included in one or more System Information Blocks (SIBs) or via other messaging protocols (e.g., RRC, MAC-CE, DCI, etc.). The UE may be configured to determine an estimated time of arrival for each of the PRS based on a current coarse location. The coarse location may be determined, for example, based on previous position estimates in combination with signals from the inertial measurement unit 270. Other base stations in a network may also be configured to receive one or more PRS or SRS from other network stations.

At stage 1404, the method includes determining a base station with a timing outage based on the measurements of the one or more positioning reference signals. The UE 200 is a means for determining a base station with a timing outage. In an example, the UE 1105 may be configured to determine ranges to the stations based on the ToA measurements as described in FIG. 8. The ranges for the stations may be used to calculate a position estimate within an established uncertainty threshold. A range value from a station that is outside the uncertainty threshold may be an indication that the station is experiencing a timing outage. For example, referring to FIG. 11B, the arrival error 1125*a* may be determined based on the expected arrival time 1125 and the actual arrival time of the DL PRS 1124. Other timing information associated with a PRS signal may be used to determine that the station may be experiencing a timing source outage.

At stage 1406, the method includes sending an indication of the base station with the timing outage to one or more network entities. The UE 200 is a means for sending the indication of the base station. In an example, the UE 1105 may be configured to transmit one or more cell timing source outage notification messages 1126 to a network entity, such as the LMF 120, based on the detection of the base station with the timing outage. The LMF 120 may be configured to notify other network stations of the timing source outage via one or more timing outage response messages 1128 (e.g., NRPPa, LPP). In an example, the UE 1105 may send the indication to other UEs via one or more sidelink messages 1160. The sidelink messages may utilize one or more sidelink schemes (e.g., PSCCH, PSSCH, V2X PC5, etc.). In an example, a base station may be configured to send an indication that another base station in the network is experiencing a timing source outage. The base station may use wired and wireless protocols to send the indication (e.g., RRC, MAC-CE, DCI, NRPPa, LPP, etc.).

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for providing an indication of a timing source outage in a communication network, comprising: detecting an outage of a timing source, wherein one or more positioning signals are synchronized with the timing source; and sending the indication of the timing source outage to a network entity.

2. The method of clause 1 further comprising sending an indication of an expected timing drift based on the timing source outage.

3. The method of clause 1 wherein the timing source is a global navigation satellite system, and detecting the outage of the timing source includes failing to decode one or more signals transmitted by one or more satellite vehicles in the global navigation satellite system.

4. The method of clause 1 wherein the outage of the timing source is detected by a base station.

5. The method of clause 4 wherein sending the indication of the timing source outage to the network entity includes sending the indication of the timing source outage to a location management function.

6. The method of clause 4 wherein sending the indication of the timing source outage to the network entity includes sending the indication of the timing source outage to a user equipment.

7. The method of clause 1 wherein the outage of the timing source is detected by a user equipment based on positioning signals transmitted from a base station.

8. The method of clause 7 wherein sending the indication of the timing source outage to the network entity includes sending the indication of the timing source outage to a location management function.

9. The method of clause 7 wherein sending the indication of the timing source outage to the network entity includes sending the indication of the timing source outage to one or more base stations.

10. The method of clause 7 wherein sending the indication of the timing source outage to the network entity includes sending the indication of the timing source outage to one or more user equipment via a sidelink.

11. A method for configuring a positioning method based on a timing source outage, comprising: receiving an indication of the timing source outage from a station; determining the positioning method based at least in part on the indication of the timing source outage; and sending an indication of the positioning method to one or more network entities.

12. The method of clause 11 wherein the indication of the timing source outage is received from the station via one or more New Radio Position Protocol messages.

13. The method of clause 11 wherein the indication of the timing source outage is received from the station via one or more Long Term Evolution Positioning Protocol messages.

14. The method of clause 11 wherein determining the positioning method includes muting positioning reference signals transmitted by the station impacted by the timing source outage.

15. The method of clause 11 wherein determining the positioning method includes generating a positioning reference signal resource set to exclude the the station impacted by the timing source outage, and wherein sending the indication of the positioning method includes sending the positioning reference signal resource set to the one or more network entities.

16. The method of clause 11 wherein determining the positioning method includes selecting a timing robust positioning method that is not dependent on a synchronized time at the network entities.

17. The method of clause 16 wherein the timing robust positioning method includes at least one of round trip time measurements, angle of arrival measurements, and angle of departure measurements.

18. The method of clause 11 wherein the indication of the timing source outage includes a timing drift rate value associated with the station impacted by the timing source outage.

19. The method of clause 18 wherein determining the positioning method includes determining that the timing drift rate value exceeds a threshold value.

20. The method of clause 18 wherein sending the indication of the positioning method to the one or more network entities includes sending the timing drift rate value to the one or network entities.

21. An apparatus, comprising: a memory; at least one transceiver; at least one processor communicatively coupled to the memory and the at least one transceiver, and configured to: detect an outage of a timing source, wherein one or more positioning signals are synchronized with the timing source; and send an indication of a timing source outage to a network entity.

22. The apparatus of clause 21 wherein the at least one processor is further configured to send an indication of an expected timing drift based on the timing source outage.

23. The apparatus of clause 21 wherein the timing source is a global navigation satellite system, and the at least one processor is further configured to detect a decode failure on one or more signals transmitted by one or more satellite vehicles in the global navigation satellite system.

24. An apparatus, comprising: a memory; at least one transceiver; at least one processor communicatively coupled to the memory and the at least one transceiver, and configured to: receive an indication of a timing source outage from a station; determine a positioning method based at least in part on the indication of the timing source outage; and send an indication of the positioning method to one or more network entities.

25. The apparatus of clause 24 wherein the indication of the timing source outage is received from the station via one or more New Radio Position Protocol messages.

26. The apparatus of clause 24 wherein the indication of the timing source outage is received from the station via one or more Long Term Evolution Positioning Protocol messages.

27. The apparatus of clause 24 wherein the at least one processor is further configured to mute positioning reference signals transmitted by the station impacted by the timing source outage.

28. The apparatus of clause 24 wherein the at least one processor is further configured to generate a positioning reference signal resource set to exclude the the station impacted by the timing source outage, and send the positioning reference signal resource set to the one or more network entities.

29. The apparatus of clause 24 wherein the at least one processor is further configured to select a timing robust positioning method that is not dependent on a synchronized time at the network entities.

30. The apparatus of clause 29 wherein the timing robust positioning method includes at least one of round trip time measurements, angle of arrival measurements, and angle of departure measurements.

31. The apparatus of clause 24 wherein the indication of the timing source outage includes a timing drift rate value associated with the station impacted by the timing source outage.

32. The apparatus of clause 31 wherein the at least one processor is further configured to determine that the timing drift rate value exceeds a threshold value.

33. The apparatus of clause 31 wherein the at least one processor is further configured to send the timing drift rate value to the one or network entities.

34. An apparatus for providing an indication of a timing source outage in a communication network, comprising: means for detecting an outage of a timing source, wherein one or more positioning signals are synchronized with the timing source; and means for sending the indication of the timing source outage to a network entity.

35. The apparatus of clause 34 further comprising means for sending an indication of an expected timing drift based on the timing source outage.

36. The apparatus of clause 34 wherein the timing source is a global navigation satellite system, and the means for detecting the outage of the timing source includes means for detecting a decode failure one or more signals transmitted by one or more satellite vehicles in the global navigation satellite system.

37. An apparatus for configuring a positioning method based on a timing source outage, comprising: means for receiving an indication of the timing source outage from a station; means for determining the positioning method based at least in part on the indication of the timing source outage; and means for sending an indication of the positioning method to one or more network entities.

38. The apparatus of clause 37 wherein determining the positioning method includes muting positioning reference signals transmitted by the station impacted by the timing source outage.

39. The method of clause 37 wherein the means for determining the positioning method includes means for selecting a timing robust positioning method that is not dependent on a synchronized time at the network entities, wherein the timing robust positioning method includes at least one of round trip time measurements, angle of arrival measurements, and angle of departure measurements.

40. The apparatus of clause 37 wherein the means for sending the indication of the positioning method to the one or more network entities includes means for sending a timing drift rate value to the one or network entities.

41. A non-transitory processor-readable storage medium comprising processor-readable instructions configured to cause one or more processors to provide an indication of a timing source outage in a communication network, comprising: code for detecting an outage of a timing source, wherein one or more positioning signals are synchronized with the timing source; and code for sending the indication of the timing source outage to a network entity.

42. A non-transitory processor-readable storage medium comprising processor-readable instructions configured to cause one or more processors to configure a positioning method based on a timing source outage, comprising: code for receiving an indication of the timing source outage from a station; code for determining the positioning method based at least in part on the indication of the timing source outage; and code for sending an indication of the positioning method to one or more network entities.

The invention claimed is:

1. A method for providing an indication of a timing source outage in a communication network, comprising:
   detecting, by a base station, an outage of a timing source, wherein one or more positioning signals are synchronized with the timing source; and
   sending the indication of the timing source outage to a location management function.

2. The method of claim 1 further comprising sending an indication of an expected timing drift based on the timing source outage.

3. The method of claim 1 wherein the timing source is a global navigation satellite system, and detecting the outage of the timing source includes failing to decode one or more signals transmitted by one or more satellite vehicles in the global navigation satellite system.

4. The method of claim 1 wherein sending the indication of the timing source outage to the location management function includes sending the indication of the timing source outage to a user equipment.

5. A method for providing an indication of a timing source outage in a communication network, comprising:
   detecting, by a user equipment based on one or more positioning signals transmitted from a base station, an outage of a timing source, wherein the one or more positioning signals are synchronized with the timing source; and
   sending the indication of the timing source outage to a network entity.

6. The method of claim 5 wherein sending the indication of the timing source outage to the network entity includes sending the indication of the timing source outage to a location management function.

7. The method of claim 5 wherein sending the indication of the timing source outage to the network entity includes sending the indication of the timing source outage to one or more base stations.

8. The method of claim 5 wherein sending the indication of the timing source outage to the network entity includes sending the indication of the timing source outage to one or more user equipment via a sidelink.

9. An apparatus, comprising:
   at least one memory;
   at least one transceiver;
   at least one processor communicatively coupled to the at least one memory and the at least one transceiver, and configured to:
      detect an outage of a timing source based on one or more positioning signals transmitted by a base station, wherein the one or more positioning signals are synchronized with the timing source; and
      send an indication of a timing source outage to a network entity.

10. The apparatus of claim 9 wherein the at least one processor is further configured to send an indication of an expected timing drift based on the timing source outage.

11. The apparatus of claim 9 wherein the timing source is a global navigation satellite system, and the at least one processor is further configured to detect a decode failure on one or more signals transmitted by one or more satellite vehicles in the global navigation satellite system.

12. An apparatus for providing an indication of a timing source outage in a communication network, comprising:
   means for detecting an outage of a timing source based on one or more positioning signals transmitted by a base station, wherein the one or more positioning signals are synchronized with the timing source; and
   means for sending the indication of the timing source outage to a network entity.

13. The apparatus of claim 12 further comprising means for sending an indication of an expected timing drift based on the timing source outage.

14. The apparatus of claim 12 wherein the timing source is a global navigation satellite system, and the means for detecting the outage of the timing source includes means for detecting a decode failure one or more signals transmitted by one or more satellite vehicles in the global navigation satellite system.

* * * * *